United States Patent
Ikeda

(10) Patent No.: US 6,812,831 B2
(45) Date of Patent: Nov. 2, 2004

(54) VEHICLE SURROUNDINGS MONITORING APPARATUS

(75) Inventor: Atsushi Ikeda, Tokyo-To (JP)

(73) Assignee: Fuji Jukogyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/162,570

(22) Filed: Jun. 6, 2002

(65) Prior Publication Data

US 2002/0186298 A1 Dec. 12, 2002

(30) Foreign Application Priority Data

Jun. 8, 2001 (JP) .......................................... 2001-174620

(51) Int. Cl.[7] .................................................. B60Q 1/00
(52) U.S. Cl. ...................... 340/435; 340/903; 340/937; 348/148
(58) Field of Search ................................ 340/903, 435, 340/937, 461; 348/118, 148

(56) References Cited

U.S. PATENT DOCUMENTS

| | | | | | |
|---|---|---|---|---|---|
| 5,680,123 A | * | 10/1997 | Lee | ............................. | 340/937 |
| 5,978,017 A | * | 11/1999 | Tino | ............................ | 348/148 |
| 6,218,960 B1 | * | 4/2001 | Ishikawa et al. | ............ | 340/901 |
| 6,424,272 B1 | * | 7/2002 | Gutta et al. | ................. | 340/937 |
| 6,580,373 B1 | * | 6/2003 | Ohashi | ....................... | 340/901 |
| 6,590,719 B2 | * | 7/2003 | Bos | ............................ | 359/753 |

FOREIGN PATENT DOCUMENTS

| | | |
|---|---|---|
| JP | 2611173 | 2/1997 |
| JP | 09-202180 | 8/1997 |
| JP | 10-283461 | 10/1998 |

* cited by examiner

Primary Examiner—Brent A. Swarthout
(74) Attorney, Agent, or Firm—Smith, Gambrell & Russell

(57) ABSTRACT

A vehicle surroundings monitoring apparatus 2 has cameras having optical axes respectively, provided with imaging lens systems 5, 6 each having a fish-eye lens 5a, 6a, image processing units 7, 8 and an calculating unit 9. The image processing units 7, 8 detects moving objects, such as vehicles traveling alongside a host vehicle provided with the vehicle surroundings monitoring apparatus, and oncoming vehicles, on the basis of optical flow between two images taken by the cameras at different times, respectively, and sets a representative point representing the detected moving object on the surface of a road. The calculating unit calculates the position of the moving object relative to the host vehicle on the basis of displacement angles $\alpha$ and $\beta$ of the representative point A with respect to the optical axis on an assumption that the representative point A is on a plane including a surface with which the host vehicle is in contact.

17 Claims, 4 Drawing Sheets

VEHICLE SURROUNDINGS MONITORING APPARATUS

BACKGROUND OF THE INVENTION

1. Field of the Invention

The present invention relates to a vehicle surroundings monitoring apparatus for a vehicle, capable of detecting moving objects, such as vehicles traveling around a vehicle provided with the vehicle surroundings monitoring apparatus (hereinafter, referred to as "host vehicle") on the basis of images provided by a fish-eye lens.

2. Description of the Related Art

Various types of vehicle surroundings monitoring apparatuses have been proposed and applied to practical uses in recent years for the improvement of safety of vehicles. Those vehicle surroundings monitoring apparatuses are capable of three-dimensionally recognizing roads and traffic conditions in a practically satisfactory accuracy and in a practically permissible time by obtaining images of scenery extending ahead of the host vehicle or objects lying in front of the host vehicle by a camera1 and processing the images.

A technique proposed in, for example, JP-A No. 283461/1998 by the applicant of the present patent application subjects images taken by a pair of cameras (stereo camera) to a stereoscopic process to detect the preceding vehicle and obstacles.

It is desirable, for the further improvement of the safety of the host vehicle, to give information about other vehicles and the like traveling beside the host vehicle to the driver in addition to that about a space in front of the host vehicle. Preferably, an image of scenery extending around the side of the host vehicle is obtained by a camera provided with a fish-eye lens to acquire information about a wide range of the side scenery. For example, a technique disclosed in JP-A No. 202180/1997 obtains an image of the side scenery by a fish-eye lens camera, converts the image into a regular image signal by a coordinate transformation circuit, and displays an optional region of a rectified image on the screen of a monitor. However, since this technique merely displays the image of a predetermined part of the vehicle's surroundings on the screen of the monitor, it is difficult to give the driver distance information representing distances between the host vehicle and other vehicles traveling beside the host vehicle.

To deal with such a difficulty in giving the driver distance information, a technique disclosed in, for example, JP-B No. 2611173 uses a monitoring system including a plurality of cameras respectively provided with fish-eye lenses. The monitoring system calculates three-dimensional coordinates indicating the three-dimensional position of a moving object on the basis of a plurality of wide-angle images provided by the plurality of cameras to acquire distance information about the distance between the host vehicle and a vehicle traveling beside the host vehicle. However, it is not economically preferable to use such a monitoring system of complicated construction for obtaining information about a side space extending around the side of the host vehicle, which may be rough as compared with information about a forward space extending in front of the host vehicle.

SUMMARY OF THE INVENTION

The present invention has been made in view of such circumstances, and it is therefore an object of the present invention to provide a vehicle surroundings monitoring apparatus of simple construction capable of obtaining proper information about the surroundings of a host vehicle.

According to one aspect of the present invention, a vehicle surroundings monitoring apparatus for monitoring the surroundings of a host vehicle includes: image obtaining means each having an imaging lens system including a fish-eye lens; an image processing means capable of detecting a moving object on the basis of an optical flow between two images obtained by the image obtaining means respectively at different times, by using one of the images as a reference image, and of setting a representative point representing the moving object on the surface of a road; and an calculating means for calculating the position of the moving object relative to the vehicle on the basis of a displacement angle of the representative point from the optical axis on an image.

In the vehicle surroundings monitoring apparatus according to the present invention, the image obtaining means are disposed on right and left side parts of a body included in the host vehicle.

In the vehicle surroundings monitoring apparatus according to the present invention, the imaging lens system has an optical axis inclined slightly rearward to a direction parallel to the width of the vehicle.

In the vehicle surroundings monitoring apparatus according to the present invention may further include a display means for displaying the positions of moving objects relative to the host vehicle, capable of indicating the velocities of the moving objects relative to the host vehicle by vector notation.

BRIEF DESCRIPTION OF THE DRAWINGS

The above and other objects features and advantages of the present invention will become more apparent from the following description taken in connection with the accompanying drawings, in which.

DESCRIPTION OF THE PREFERRED EMBODIMENTS

Figure 1:
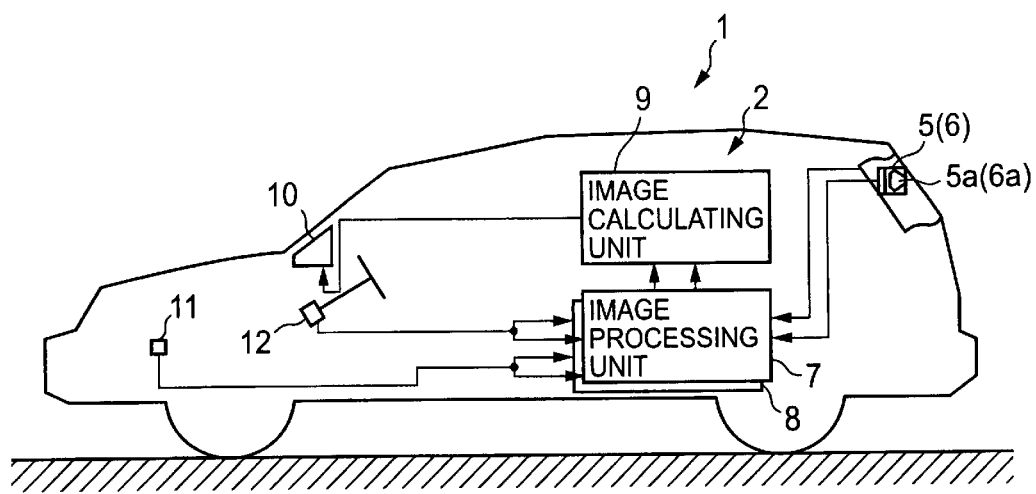
FIG. 1 is a functional block diagram of a vehicle surroundings monitoring apparatus in a preferred embodiment according to the present invention.

Referring to FIG. 1, a vehicle provided with a vehicle surroundings monitoring apparatus 2 in a preferred embodiment according to the present invention, i.e. a host vehicle, has a body 1. The vehicle surroundings monitoring apparatus 2 obtains images of outside sceneries in set ranges, recognizes outside moving objects, such as vehicles traveling alongside the host vehicle and oncoming vehicles, and monitors the outside moving objects. The vehicle surroundings monitoring apparatus 2 comprises cameras (image obtaining means) 5 and 6 disposed on the right and the left side of the body 1 respectively, image processing units (image processing means) 7 and 8 capable of processing images obtained by the cameras 5 and 6 to detect moving objects, such as vehicles traveling alongside the host vehicle and oncoming vehicles, and setting representative points representing the detected moving objects on the surface of a road a calculating unit (calculating means) 9 capable of calculating the respective positions of the moving objects relative to the host vehicle on the basis of angles of displacement of the representative points on the image to an optical axis, and a display (display means) 10 for displaying an image representing the calculated positional relation between the host vehicle and the moving objects.

Figure 2:
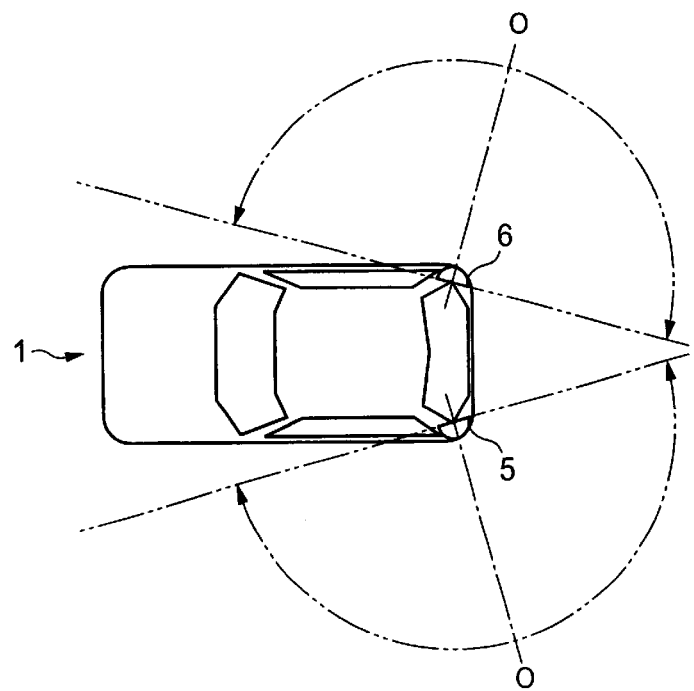
FIG. 2 is a diagrammatic view for explaining image regions obtained by a image obtaining means in an example.

The cameras 5 and 6 comprise imaging lens systems 5a and 6a including fish-eye lenses, and solid-state image sensors, not shown, respectively. The imaging lens systems 5a and 6a focus incident light on the surfaces of the solid-state image sensors, respectively. The cameras 5 and 6 have a large angular range of 180 degrees. As shown in FIGS. 1 and 2, the cameras 5 and 6 are attached, for example, to rear parts of the body 1 at a height H, respectively, such that the optical axes O of the imaging lens systems 5a and 6a are inclined slightly rearward to a direction parallel to the width of the body 1 in a horizontal plane. As shown in FIG. 2, the respective angular ranges of the cameras 5 and 6 cover substantially entirely a space around the right and the left side of the body 1 and behind the body 1. In this embodiment, the vehicle is supposed to be a wagon and the body 1 is of a wagon type. Desirably, the cameras are attached to the D-pillars of the body 1.

The cameras 5 and 6 are connected to the image processing units 7 and 8 to give images to the image processing units 7 and 8, respectively. Also connected to the image processing units 7 and 8 are speed sensor 11 for measuring the traveling speed of the host vehicle and a steering angle sensor 12 for measuring steering angles. Each of the image processing units 7 and 8 produces an optical flow from the two successive images obtained at different times by each of the cameras 5 and 6 to detect moving objects, such as vehicles traveling alongside the host vehicle, and oncoming vehicles. That is, each of the image processing units 7 and 8 produces an optical flow indicating a distribution of velocity vectors in each of predetermined pixel blocks through the matching of the luminance pattern of the pixel block in the image taken at the later time, i.e., a reference image, and that of the pixel block in the image taken at the earlier time, i.e., a comparative image.

Figure 3:
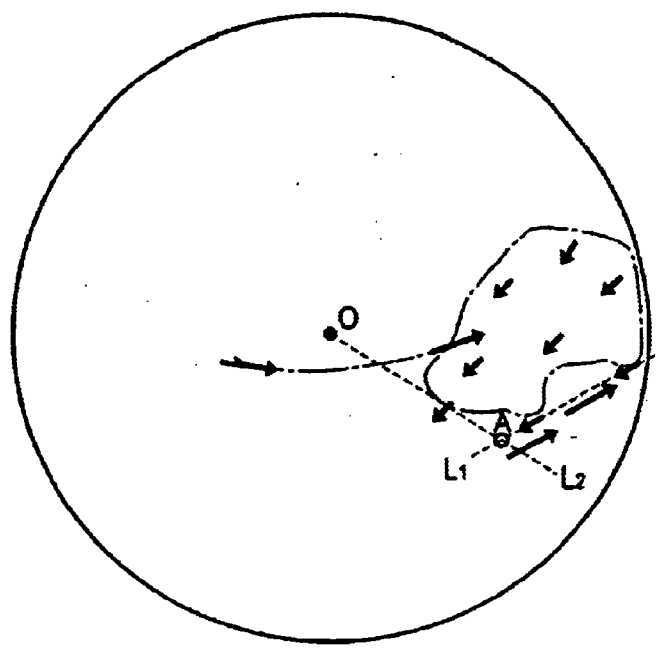
FIG. 3 is a simplified diagram showing a distribution of velocity vectors.
Figure 4:
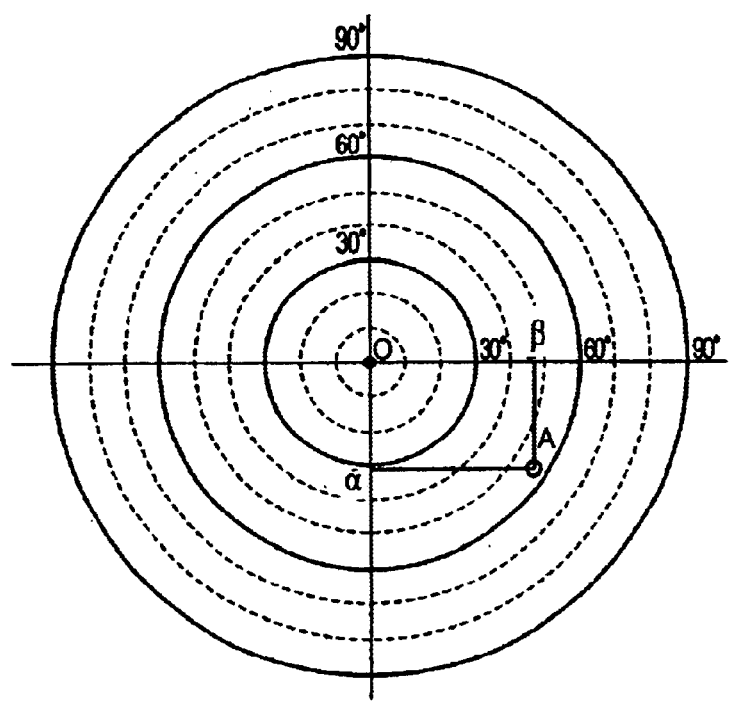
FIG. 4 is a diagram showing a coordinate system for indicating angle of displacement from an optical axis.
Figure 5:
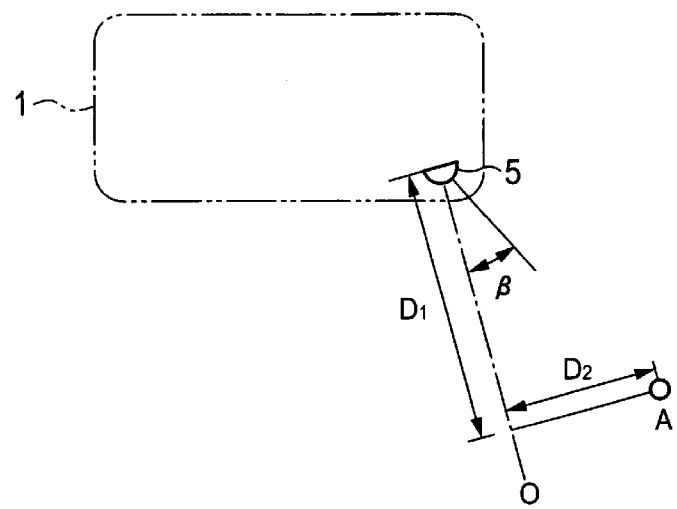
FIG. 5 is a diagrammatic view for explaining the positional relation between a vehicle and a representative point.

As shown in FIG. 3, velocity vectors representing the velocities of fixed objects, such as the surface of a road, have a direction substantially opposite to the traveling direction of the host vehicle and a magnitude substantially equal to the traveling velocity of the host vehicle. To the contrast, velocity vectors representing the velocities of moving objects, such as vehicles traveling alongside the host vehicle, and oncoming vehicles, have magnitudes different from that of a velocity vector representing the traveling speed of the host vehicle. The image processing units 7 and 8 recognize a group of similar velocity vectors having magnitudes different from that of the velocity vector of the host vehicle as a velocity vector group representing the velocity of a single moving object for moving object detection.

The image processing units 7 and 8 set a representative point on a road surface on the basis of the detected velocity of the moving object for moving object. That is, the image processing units 7 and 8 set a position, where the velocity vector of the lowest point of the moving object is in contact with the velocity vector of the fixed objects, as a contact point on the road surface. As shown in FIG. 3, when the moving object is a vehicle traveling alongside the host vehicle, the contact point where the moving object is in contact with the surface of the ground correspond substantially to a point where a tire of the vehicle is in contact with the surface of the ground. The image processing units 7 and 8 draw a line segment L1 passing the contact point and parallel to the velocity vector group of the moving object on the image, draw a line segment L2 extending between a velocity vector at the head or the tail of the velocity vector group and nearest to the host vehicle, and the center of field (optical axis O), and set a representative point A at the intersection of the line segments L1 and L2. As shown in FIG. 3, the representative point A does not necessarily coincide with an end of the body (moving object). In such a case, the representative point A has an error on the side of the host vehicle (safety side).

The image processing units 7 and 8 are connected to the calculating unit 9 to give information about the representative point A of each of moving objects on the image. The calculating unit 9 calculates the vertical displacement angle $\alpha$ and horizontal displacement angle $\beta$ of the representative point A with respect to the optical axis O on the image. A coordinate system for indicating displacement angles with respect to the optical axis O on the image is set in the calculating unit 9, and the calculating unit 9 calculates the vertical displacement angle a and horizontal displacement angle $\beta$ of the representative point A on the basis of the coordinate system. Then, the calculating unit 9 calculates a distance D1 to the representative point A along the optical axis O, and a distance D2 from the representative point A to the optical axis O along a perpendicular from the representative point A to the optical axis O.

Figure 6:
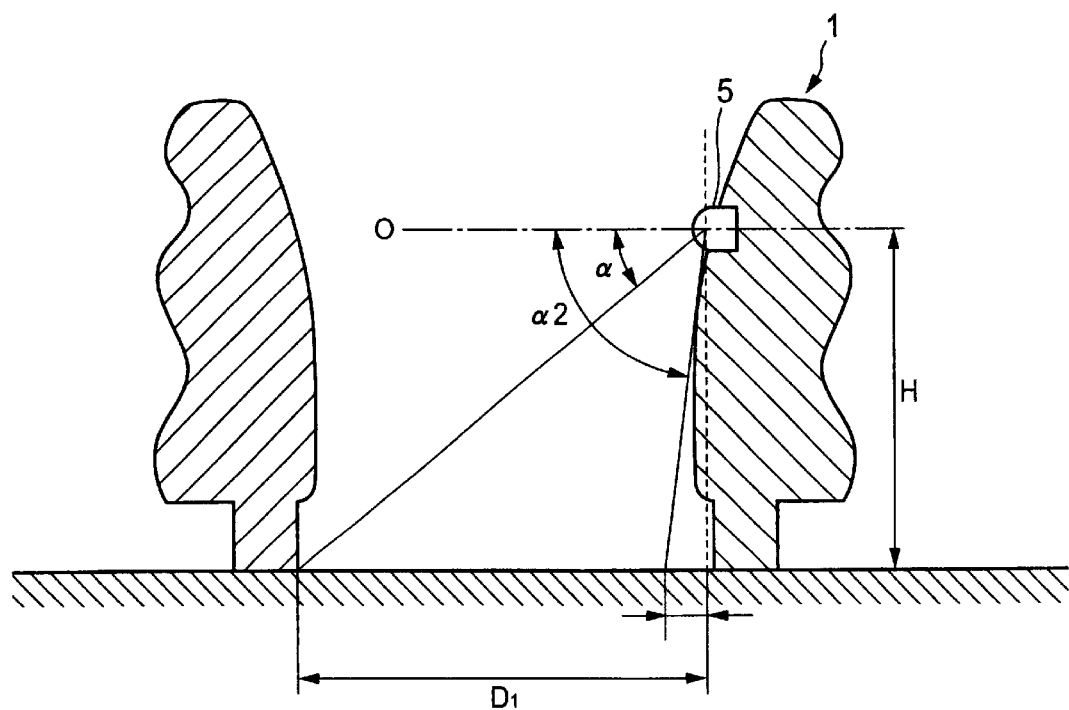
FIG. 6 is a diagrammatic view of for explaining a method of calculating the distance between a vehicle and a representative point with respect to a direction parallel to an optical axis.
Figure 7:
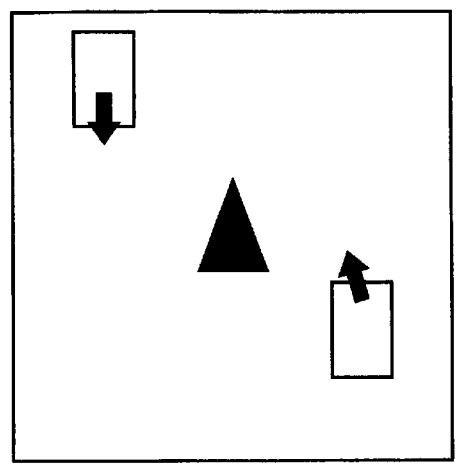
FIG. 7 is a diagrammatic view showing an image displayed on the screen of a display.

Since the optical axis O extends in a horizontal plane at a height H from the surface of the road as shown in FIG. 6, the distance D1 is expressed by Expression (1) on an assumption that the surface of the road on which the representative point A is located and a contact surface with which the host vehicle is in contact are included in the same plane.

$$D1 = H \cdot \tan(90 - \alpha) \tag{1}$$

D2 is expressed by Expression (2).

$$D2 = D1 \cdot \tan \beta \tag{2}$$

Thus, the position of the moving object relative to that of the host vehicle is defined.

If a part of the body 1 is included in the field of view of the imaging lens systems 5a and 6a as shown in FIG. 6, the displacement angle $\alpha2$ of a boundary between the body 1 and the surface of the road may be measured and may be used as reference information about the displacement angle $\alpha$. The displacement angle $\alpha2$ is dependent on the positions of the cameras 5 and 6, and the morphology of the body 1. If the positions of the cameras 5 and 6 include an error, the displacement angle $\alpha2$ changes. Therefore, the accuracy of detection of the position of the moving object relative to that of the host vehicle can be improved by correcting the displacement angle $\alpha$ according to an error in the displacement angle $\alpha2$.

The calculating unit 9 generates an output signal to be given to the display 10 on the basis of information about the respective positions of the moving objects relative to the position of the host vehicle. For example, a triangle representing the host vehicle is displayed in a central part of the screen of the display 10, and rectangles representing the moving objects, such as vehicles traveling alongside the host vehicle and oncoming vehicles, are displayed on the screen of the display 10. The velocities of the moving objects relative to the host vehicle are displayed by vector notation on the screen of the display 10. When the distance between the host vehicle and the moving object decreases below a predetermined threshold, a warning may be given to that effect by, for example, flickering the rectangle representing the moving object.

Since the vehicle surroundings monitoring apparatus 2 in this embodiment obtains images of objects around the host vehicle by the cameras 5 and 6 having the imaging lens systems 5a and 6a provided with fish-eye lenses, respectively, the vehicle surroundings monitoring apparatus 2 is capable of obtaining an images of a wide range by using a small number of image obtaining devices.

The vehicle surroundings monitoring apparatus 2 is able to detect easily moving objects, such as vehicles traveling alongside the host vehicle, and oncoming vehicles, by producing an optical flow between two images successively obtained at different times, respectively.

The position of a moving object relative to the host vehicle can be readily calculated on the basis of the displacement angle from the optical axis O by setting the representative point A representing the detected moving object on the surface of the road. That is, the cameras 5 and 6 are set on the host vehicle with their optical axes O extended in a horizontal plane, and the distance between the host vehicle and the representative point A can be readily calculated on the basis of the displacement angle from the optical axis O on an assumption that the representative point A is in a plane including the surface with which the host vehicle is in contact. Therefore, any stereoscopic image processing operation and the like are unnecessary, the positional relation between the host vehicle and the moving object can be recognized from an image obtained by the single camera 5 or 6. Thus, proper information about the ambience of the host vehicle can be obtained by the vehicle surroundings monitoring apparatus of a simple configuration. The surroundings of the host vehicle can be effectively monitored by a small number of imaging devices by disposing the cameras 5 and 6 on the right and the left side of the body 1, respectively.

Images of regions which are difficult for the driver to monitor can be effectively obtained by disposing the cameral 5 and 6 with their optical axes O inclined slightly rearward to a direction parallel to the width of the host vehicle.

Indication of the velocities of the moving objects relative to the host vehicle by vector notation on the display 10 is effective in making the driver recognize vehicles traveling alongside the host vehicle, and oncoming vehicles.

Figure 8:
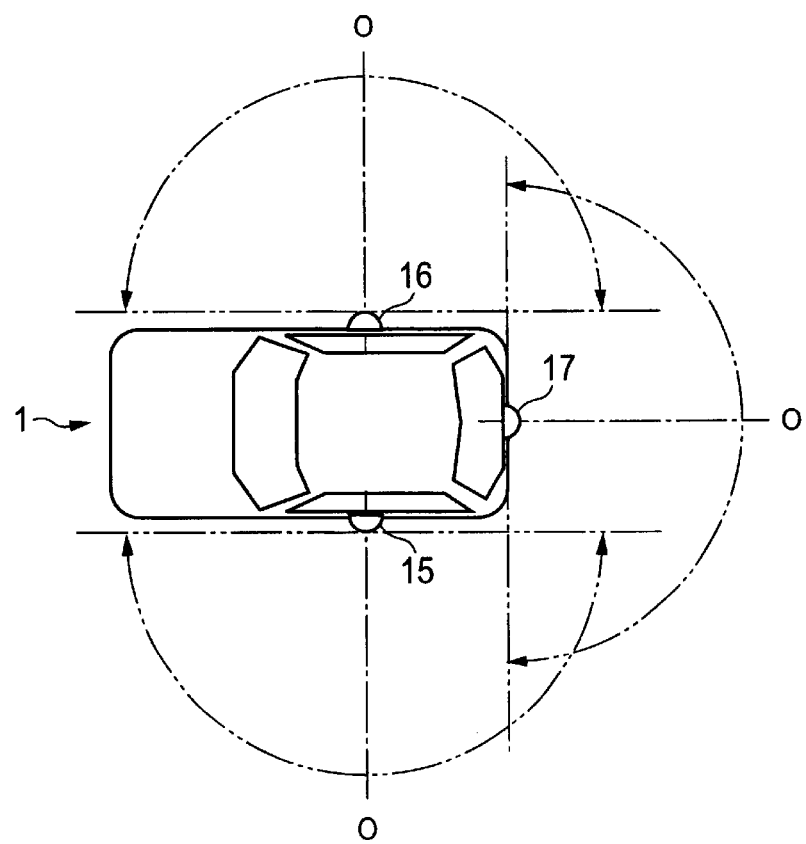
FIG. 8 is a diagrammatic view for explaining image regions obtained by a image obtaining means in another example.

Although the vehicle surroundings monitoring apparatus 2 in the foregoing embodiment is provided with the cameras 5 and 6 disposed at the right and the left part of the body 1, the vehicle surroundings monitoring apparatus may be provided with cameras 15 and 16 disposed at right and left parts of the body 1, respectively, and a camera 17 disposed at a rear part of the body 1 as shown in FIG. 8. When the vehicle surroundings monitoring apparatus is provided with the cameras 15, 16 and 17, it is desirable to dispose the cameras 15 and 16 on the body 1 with their optical axes O extended in a middle part of the body 1 in parallel to the width of the body 1.

As apparent from the foregoing description, according to the present invention, the vehicle surroundings monitoring apparatus is simple in construction and is capable of acquiring information about the surroundings of the vehicle by using a small number of image obtaining means.

Although the invention has been described in its preferred embodiment with a certain degree of particularity, obviously many changes and variations are possible therein. It is therefore to be understood that the present invention may be practiced otherwise than as specifically described herein without departing from the scope and spirit thereof.

What is claimed is:

1. A vehicle surroundings monitoring apparatus comprising:

image obtaining means with an optical axis for obtaining an image of outside scenery;

image processing means capable of detecting a moving object on the basis of an optical flow between two images obtained by the image obtaining means at different times, using one of the images as a reference image, and of setting a representative point representing the moving object on a surface of a road; and a calculating unit for calculating a relative position of the moving object to the vehicle defined by a first distance from the vehicle to the representative point along the optical axis and a second distance from the representative point to the optical axis along a perpendicular to the optical axis on the basis of displacement angles of the representative point from the optical axis.

2. The vehicle surroundings monitoring apparatus according to claim 1, wherein the image obtaining means are disposed on right and left side parts of a body included in a host vehicle, respectively.

3. The vehicle surroundings monitoring apparatus according to claim 2, wherein said image obtaining means includes left and right imaging lens systems with each imaging lens system having an optical axis inclined slightly rearward to a direction parallel to width of the host vehicle.

4. The vehicle surroundings monitoring apparatus according to claim 1 further comprising a display means for displaying relative positions of moving objects relative to that of the host vehicle, capable of indicating velocities of the moving objects relative to the host vehicle by vector notation.

5. The vehicle surroundings monitoring apparatus according to claim 2 further comprising a display means for displaying relative positions of moving objects relative to that of the host vehicle, capable of indicating velocities of the moving objects relative to the host vehicle by vector notation.

6. The vehicle surroundings monitoring apparatus according to claim 3 further comprising a display means for displaying relative positions of moving objects relative to that of the host vehicle, capable of indicating velocities of the moving objects relative to the host vehicle by vector notation.

7. The vehicle surroundings monitoring apparatus according to claim 1, wherein the image obtaining means has an imaging lens system including a fish-eye lens.

8. The vehicle surroundings monitoring apparatus according to claim 1, wherein the displacement angles comprise a vertical displacement angle and a horizontal displacement angle.

9. The vehicle surroundings monitoring apparatus according to claim 1, wherein the moving object is an adjacent vehicle, and wherein the calculating unit calculates the relative position on the basis of a distance between the optical axis and the adjacent vehicle's contact surface.

10. The vehicle surroundings monitoring apparatus according to claim 1, wherein the calculating unit calculates the relative position in set as the relative position is located on the same surface as a vehicle's contact surface.

11. The vehicle surrounding monitoring apparatus according to claim 1, wherein said image obtaining means includes left and right vehicle side imaging lens systems each with an angular range of 180°.

12. The vehicle surrounding monitoring apparatus according to claim 1, further comprising a vehicle speed sensor and a vehicle steering angle sensor and wherein said imaging processing means receives vehicle speed sensor and vehicle steering angle sensor input.

13. The vehicle surrounding monitoring apparatus according to claim 1, wherein said image processing means includes image processing units which set the representative point on the road surface on the basis of similar velocity vector group recognition which similar velocity vector group represents the moving object velocity.

14. The vehicle surrounding monitoring apparatus according to claim 13, wherein said image processing means determines the representative point by determining a velocity vector of a lowest point on the moving object that is in contact with the fixed objects velocity vector as a moving object contact point on the road surfaces and determines an intersection of lines L1 and L2 with line L1 representing a line segment passing the contact point and parallel to the velocity vector group of the moving object on the image, and L2 representing a line segment extending between a velocity vector of the velocity vector group of the moving object which is nearest to the vehicle and a center of field point represented by the optical axis.

15. The vehicle surrounding monitoring apparatus of claim 14, wherein said calculating unit determines said first distance (D1) in accordance with the formula D1=H·tan (90−$\alpha$) with H equal to the vertical height of the image processing means from the vehicle contact surface and a being a vertical displacement angle of the representative point to the optical axis, and said second distance (D2) is determined by said calculating unit in accordance with the formula D2=D1·+an $\beta$ with $\beta$ being a horizontal displacement angle of the representation point to the optical axis.

16. The vehicle surrounding monitoring system of claim 1, wherein in determining said displacement angles there is involved a correction angle determination to compensate for a body part of the host vehicle being in a field of view of the imaging means.

17. The vehicle surroundings monitoring apparatus according to claim 4, wherein said vector notation flashes as a warning indicator when said calculating means determines a moving object is at a position too close to the host vehicle.

* * * * *